US007437660B1

(12) United States Patent
Mehta et al.

(10) Patent No.: US 7,437,660 B1
(45) Date of Patent: *Oct. 14, 2008

(54) EDITABLE DYNAMICALLY RENDERED WEB PAGES

(75) Inventors: Chintan Mehta, Sammamish, WA (US);
Sergey Dubinets, Bellevue, WA (US);
Michael P. Arcuri, Seattle, WA (US);
Michael Joseph Morton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

This patent is subject to a terminal disclaimer.

(21) Appl. No.: 09/602,806

(22) Filed: Jun. 23, 2000

(51) Int. Cl.
*G06F 17/00* (2006.01)
*G06F 15/16* (2006.01)

(52) U.S. Cl. ................... 715/205; 715/234; 715/240; 709/203; 709/219

(58) Field of Classification Search .......... 707/10; 709/206, 313, 201, 203, 219; 345/744; 482/8; 700/52; 715/200, 205, 234, 240, 255, 256, 715/749, 760, 762, FOR. 209
See application file for complete search history.

(56) References Cited

U.S. PATENT DOCUMENTS

| | | | |
|---|---|---|---|
| 5,550,746 A | | 8/1996 | Jacobs |
| 5,925,100 A | * | 7/1999 | Drewry et al. ............... 709/219 |
| 5,983,227 A | * | 11/1999 | Nazem et al. ................. 707/10 |
| 5,991,802 A | * | 11/1999 | Allard et al. ................. 709/219 |
| 6,021,426 A | * | 2/2000 | Douglis et al. .............. 709/203 |
| 6,188,400 B1 | * | 2/2001 | House et al. ................ 715/805 |
| 6,272,493 B1 | * | 8/2001 | Pasquali ....................... 707/10 |
| 6,295,061 B1 | * | 9/2001 | Park et al. .................... 715/764 |
| 6,317,777 B1 | * | 11/2001 | Skarbo et al. ............... 709/204 |
| 6,353,839 B1 | * | 3/2002 | King et al. ................... 715/513 |
| 6,363,433 B1 | * | 3/2002 | Nakajima ................... 719/313 |
| 6,366,956 B1 | | 4/2002 | Krishnan |
| 6,370,561 B1 | * | 4/2002 | Allard et al. ................ 709/203 |
| 6,430,546 B1 | | 8/2002 | Stewart et al. |

(Continued)

FOREIGN PATENT DOCUMENTS

EP 0774722 * 5/1997

OTHER PUBLICATIONS

Jim Conallen, Modeling Web application architecture with UML, Oct. 1999, ACM Press, vol. 42, Issue 10, pp. 63-70.*

(Continued)

*Primary Examiner*—Doug Hutton
*Assistant Examiner*—Maikhanh Nguyen
(74) *Attorney, Agent, or Firm*—Workman Nydegger

(57) ABSTRACT

A method and system for downloading an editable web page having corresponding dynamic content. Dynamically rendered web pages are provided with a special script therein. In response to a client request for a dynamically rendered web page, the server sends the editable page with the script embedded therein. When the script is executed at the client, it creates a frame in the browser, and provides a reference to a DLL that is located on the server and the address for the same requested web page. The DLL is executed at the server and, in response, opens the dynamically rendered web page, retrieves dynamic content for the web page from a database, loads the dynamic content into the document, and returns the web page with the dynamic content to the browser as the content for the newly created frame.

13 Claims, 7 Drawing Sheets

U.S. PATENT DOCUMENTS

| | | | |
|---|---|---|---|
| 6,463,352 B1* | 10/2002 | Tadokoro et al. | 700/169 |
| 6,583,348 B2 | 6/2003 | Hasegawa et al. | |
| 6,593,944 B1* | 7/2003 | Nicolas et al. | 345/744 |
| 6,606,525 B1* | 8/2003 | Muthuswamy et al. | 700/52 |
| 6,647,410 B1* | 11/2003 | Scimone et al. | 709/206 |
| 6,701,368 B1* | 3/2004 | Chennapragada et al. | 709/228 |
| 6,792,459 B2* | 9/2004 | Elnozahy et al. | 709/224 |
| 6,892,226 B1* | 5/2005 | Tso et al. | 709/218 |
| 6,971,973 B2* | 12/2005 | Cohen et al. | 482/8 |
| 6,990,653 B1* | 1/2006 | Burd et al. | 717/108 |
| 7,174,506 B1* | 2/2007 | Dunsmoir et al. | 715/513 |
| 2001/0014895 A1* | 8/2001 | Sappal | 707/500 |
| 2002/0133365 A1 | 9/2002 | Grey et al. | |
| 2002/0194112 A1 | 12/2002 | dePinto et al. | |
| 2003/0033448 A1* | 2/2003 | Kieffer | 709/331 |
| 2003/0208533 A1 | 11/2003 | Farquharson et al. | |
| 2003/0208578 A1 | 11/2003 | Taraborelli et al. | |
| 2003/0217059 A1 | 11/2003 | Allen et al. | |
| 2003/0236700 A1 | 12/2003 | Arning et al. | |

OTHER PUBLICATIONS

Symantec, How to run LiveUpdate, Dec. 16, 1999 (available at <http://service1.symantec.com/SUPPORT/sharedtech.nsf/docid/1999121613163206>).*

A. Si et al., "Maintaining page coherence for dynamic HTML pages," ACM Press, Feb. 1998, pp. 767-773.*

V. Anupam et al., "Personalizing the Web Using Site Descriptions" IEEE Computer Society, Tenth International Workshop on Database and Expert Systems Applications, Sep. 1-3, 1999, pp. 1-7.*

Anonymous, International Search Report in Corresponding EP Application No. PCT/US03/3854.

Mui, Lik, Ari Halberstadt, and Mojdeh Mohtashemi. *"Notions of Reputation in Multi-Agents systems: A Review."* AAMAS'02 Jul. 15-19, 2002, Bologna, Italy. p. 280-287.

Maximilien, Michael E., and Munidar P. Singh. "Conceptual Model of Web Service Reputation." SIGMOD Record, vol. 31, No. 4, Dec. 2002. p. 36-41.

* cited by examiner

EDITABLE DYNAMICALLY RENDERED WEB PAGES

FIELD OF THE INVENTION

The present invention generally relates to computer systems, and more particularly to downloading of web pages from a remote computer system.

BACKGROUND OF THE INVENTION

Some contemporary web servers include a filtering mechanism that evaluates an address, such as a web page address, to determine if that address should be handled in any special way (e.g. processed to add in dynamic content). A web server with a filter evaluates content that is requested by a browser, and, if there is dynamic content that is to be added to the web page, runs code to retrieve the dynamic content. The dynamic content is usually pulled from a database, and may or may not be combined with a template page (e.g., an HTML template page). One problem with this system is that for servers having only a few pages with dynamic content, checking all documents for dynamic content is an expensive process, wasting server resources and resulting in slower client experience and fewer clients that may be handled by an individual server.

One more disadvantage of such a 'filtering' scheme is that, if filters are utilized, the filters may have to be written differently for different web servers. In addition, various website hosting companies may not want to install filters on their servers due to the reduced client workload mentioned above.

An alternative method used by contemporary web servers to provide web pages having dynamic content is to enable a file type other than HTML or XML, with a different file extension (e.g., .asp instead of .htm). The different extension is easily recognized by the web server, and thus the expensive filtering operation is not required. Although this solution addresses the expense of filtering the web pages, the alternative file types have other drawbacks, for example, .asp files cannot be easily edited using current web page authoring programs.

Another alternative used by contemporary web servers to provide dynamically rendered web pages is to utilize multiple pages, wherein a first page sent to a client machine includes a link to a dynamically rendered page. A browser scans the page and requests the dynamically rendered page according to the link information. The dynamic page is then rendered to the user. A problem with this solution is that a web page author is required to create more than one web page (e.g., a dynamic page using asp and an HTML page including the link) for every dynamically rendered web page.

SUMMARY OF THE INVENTION

Briefly, the present invention provides a method and system for downloading an editable web page (e.g., an HTML web page) having corresponding dynamic content (collectively a "dynamically rendered web page") without requiring filtering of the addresses of the pages at the server, and then rendering the page in a way that adds dynamic content at the server. To this end, dynamically rendered web pages are provided with a special script therein, whereby the server does not treat the page any differently from other pages having only static content. In response to a client request for a dynamically rendered web page, the server sends the editable page with the script embedded therein as it would any other page, i.e., without filtering.

When the script is executed at the client, it creates a frame in the browser, and provides a reference to a DLL that is located on the server along with the address for the same requested web page. The DLL is executed at the server and, in response, opens the dynamically rendered web page (at the server), retrieves dynamic content for the web page from a database, loads the dynamic content into the document, and returns the web page with the dynamic content to the browser as the content for the newly created frame. The use of the embedded script provides the benefit that users do not have to create a separate frameset page. In addition, the user may edit the static parts of the page directly, since the script is not executed in an HTML document editing application. The use of a frame also provides the benefit that the content is visibly rendered only once to the viewer.

The reference to the dynamically rendered web page thus comprises a URL to a DLL instead of a URL to the actual file for the dynamically rendered web page. A base tag is created that represents a dynamically-set URL to the actual file for the dynamically rendered web page. The base tag may be used in relative hyperlinks (links to pages or other content that are related to the dynamically rendered web page), so that the hyperlinks are not broken. In addition, the target for the base tag is set to "parent", so that navigation from within the frame navigates a user to outside the frame, instead of maintaining the user within the frame. Also, the pages are editable, in that when a file is opened for editing, the editing application ignores the script that creates a frame in the browser, and edits the contents of the page directly.

Parameters that are sent to the dynamically rendered web page are passed to DLL by appending the string for the parameters to the URL for the DLL. In this manner, the parameters are acted on by the DLL, and may cause different dynamic content to be displayed in the web page. For example, parameters to sort the dynamically loaded content according to particular criteria are added to a DLL, and the sort parameters are applied to the dynamic content upon loading. This feature permits a user to click on a link to sort the content, which affects the URL in the address bar, not just the URL to the DLL inside of the frame. Thus, when the user emails a hyperlink to the sorted content, or saves that page in favorites in a browser, the URL contains all of the necessary information to retrieve that same sorted state.

Other advantages will become apparent from the following detailed description when taken in conjunction with the drawings, in which:

DETAILED DESCRIPTION

Exemplary Operating Environment

Figure 1:
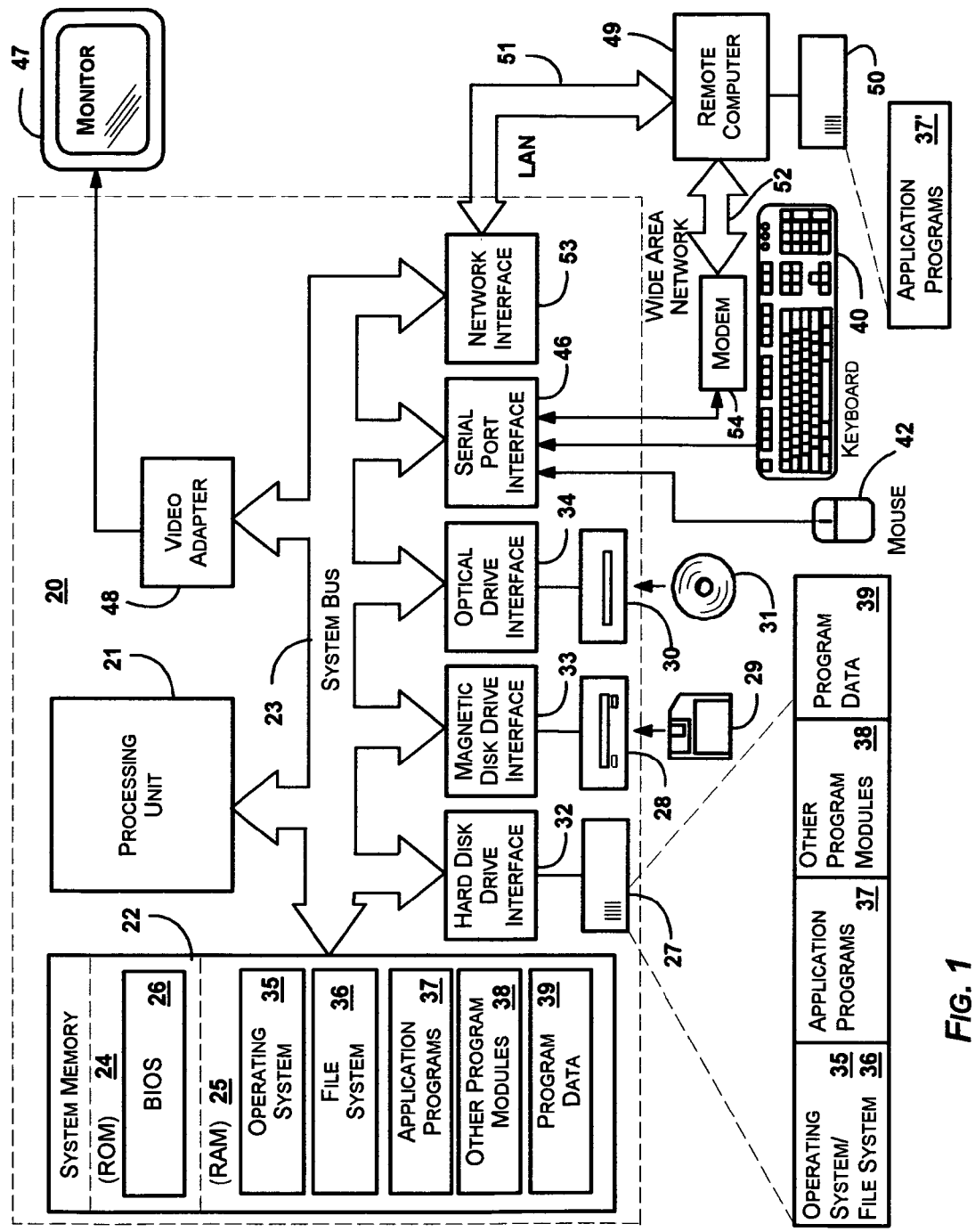
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system 36 therein and/or associated therewith), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Editable Dynamically Rendered Web Pages

Figure 2:
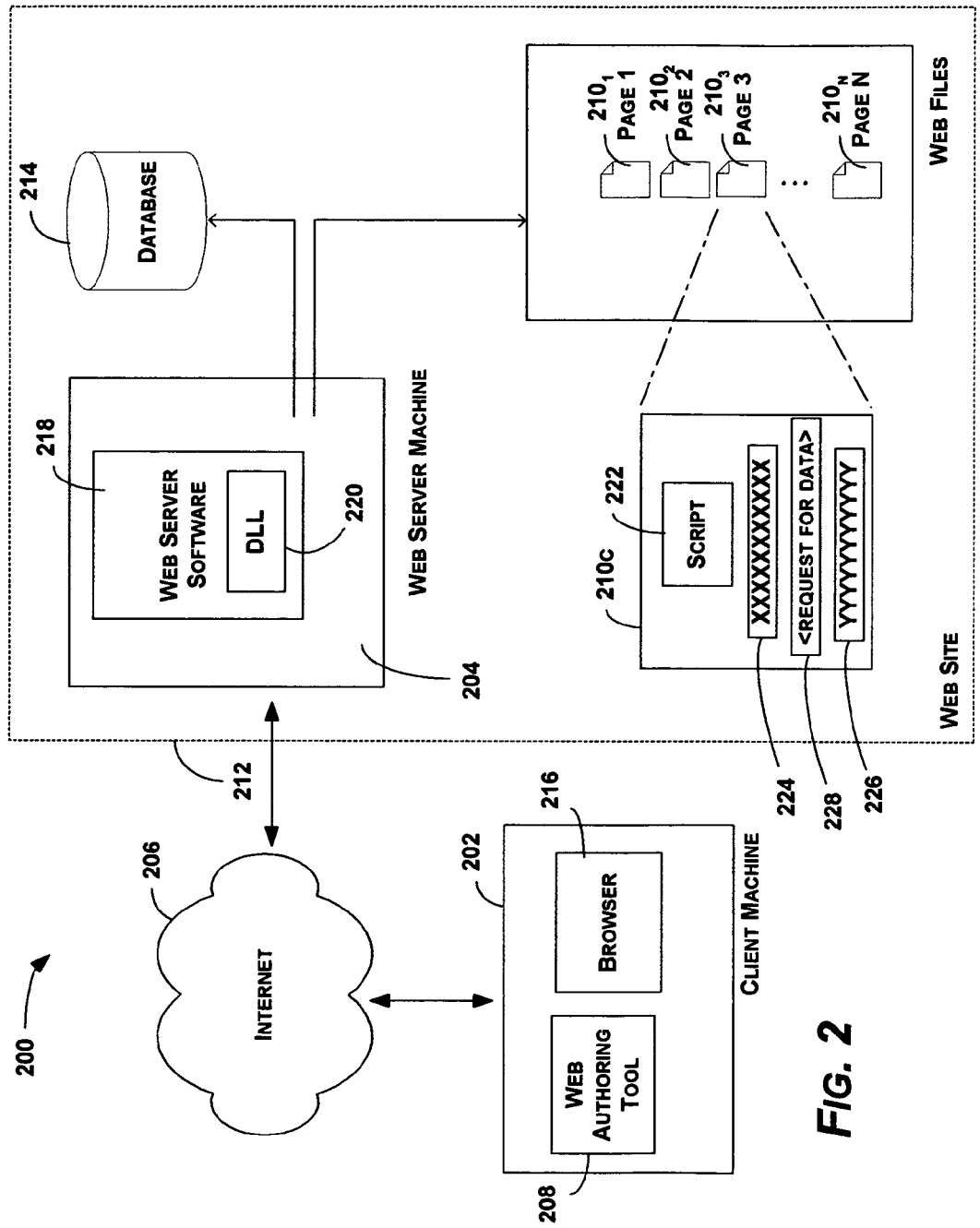
FIG. 2 is a functional block diagram that represents an illustrative system for rendering dynamically rendered web pages in accordance with the present invention.

FIG. 2 is a functional block diagram that, together with the following discussion, provides a brief, general description of an illustrative system 200 for rendering the dynamically rendered web pages in accordance with the present invention. The system 200 includes a client machine 202 (e.g., the computer system 20) coupled to a Web server machine 204 (e.g., the remote computer 49). The client machine 202 and the Web server machine 204 may communicate with each other through the Internet 206. Alternatively, the client machine 202 and the Web server machine 204 may be connected through a Local Area Network such as described above. In addition, the functions of the client machine and the server machine may be provided as separate program processes on the same physical machine.

The client machine 202 includes a Web authoring tool 208 (e.g., Microsoft Corporation's FrontPage® web authoring tool). The Web authoring tool 208 may be used to edit or create Web files. In the example shown, the web authoring tool 208 may be used to access web files $210_1$-$210_N$ that reside in a web site 212. The client machine also includes network access software, such as a browser 216, for viewing Web files (e.g., the web files $210_1$-$210_N$). As is described further below, if the web file 210 being viewed includes dynamic information, the present invention provides a new method by which the dynamic information may be accessed from a database (e.g., a database 214 for the website 212) and combined with the respective web file for viewing.

The Web server machine 204 includes Web server software 218 for accessing and serving the web Files $210_1$-$210_N$ upon request. In addition to conventional features, the Web server software 218 additionally includes executable code, preferably in the form of a dynamic link library (DLL) 220, the function of which is described below.

The web files $210_1$-$210_N$ described herein are preferably formed from an editable language, for example, HTML (Hypertext Markup Language). HTML-created pages permit easy embedding of hyperlinks to web-based URLs or local references, and editing by a designer or a user. Note, however, there is no intention to limit the present invention to HTML, as virtually any page format language, e.g., XML (Extensible Markup Language) or DHTML (Dynamic HTML) or other page creation mechanism will suffice.

In accordance with one aspect of the present invention, web files 210 that are rendered with dynamic content include a list of commands, or command information, such as in the form of a script, in the web file. For example, the web file $210_3$ shown in FIG. 2 includes a script 222 therein. Alternatively, the commands of the script may be included from another source in the "include" section of a web file. The script 222 is contained within the web file $210_3$, such as in a header section or in a comment section. The function of the script 222 is described further below. The web file $210_3$ may further include text or graphics 224, 226, and at least one portion that is filled by dynamic content pulled from the database 214 or another source. The portion may, for example, be an XML tag 228 that indicates that dynamic information should be inserted from the database 214.

Figure 3:
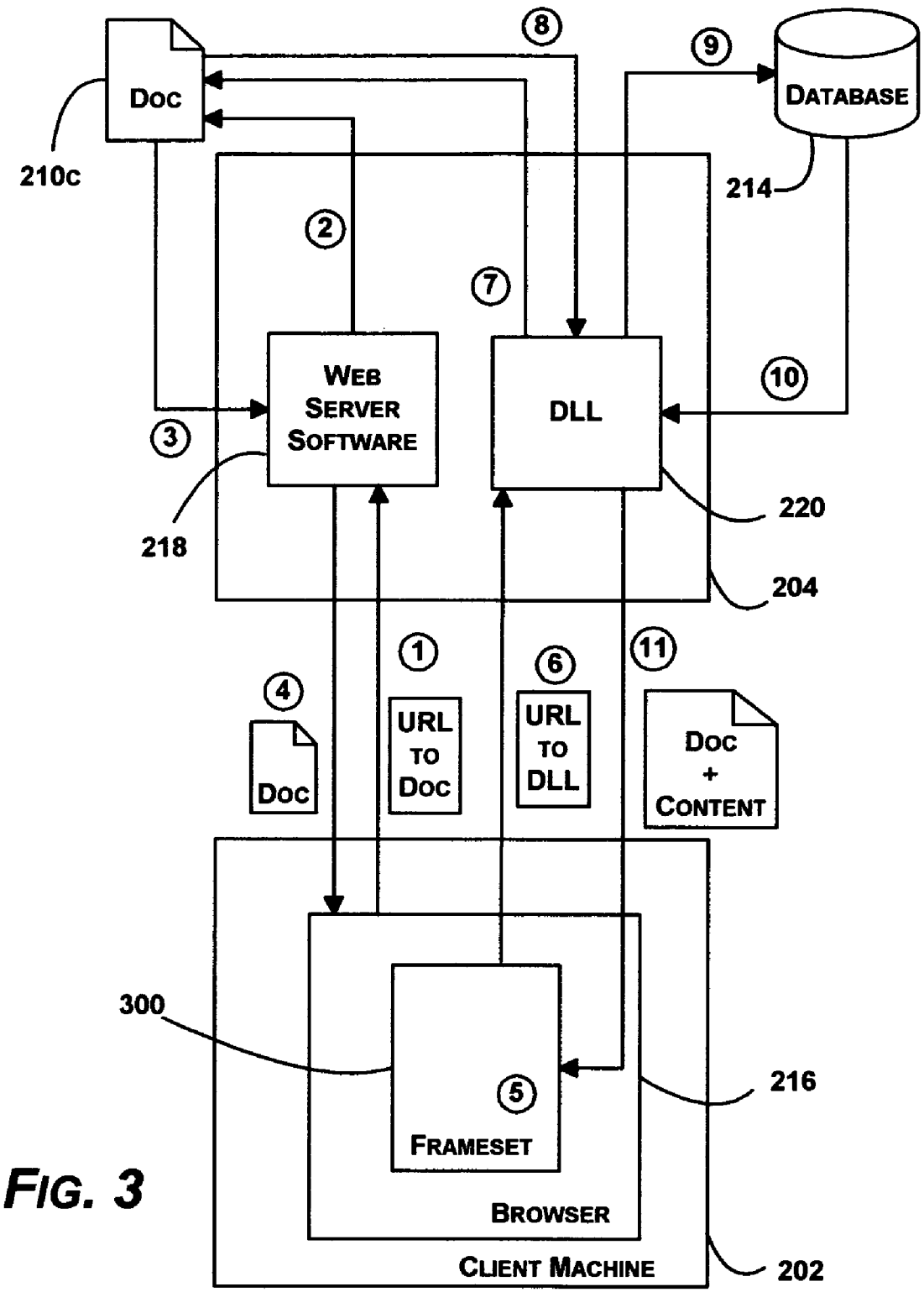
FIG. 3 is a block diagram representing a process by which a dynamically rendered web file is rendered in accordance with one aspect of the present invention.

FIG. 3 is a block diagram representing a process by which a dynamically rendered web file is rendered in accordance with one aspect of the present invention, wherein the steps of FIG. 3 are represented by arrows labeled with circled numbers. At step 1, a user requests, via the client machine 202, a web file having dynamic content (e.g., the web file $210_3$). As one skilled in the art will appreciate, remote files such as the web Files $210_1$-$210_N$ may be accessed, such as via the File Transfer Protocol (FTP) via the Internet 206, or as a file copy over the optional Local Area Network. To access a remote web file, a user may, for example, enter a uniform resource locator (URL) in the browser 216 on the client machine 202.

In any event, the user, via the client machine 202, requests the web file $210_3$ from the web server machine 204. The web server software 218 receives the request and retrieves the web file $210_3$ (steps 2 and 3). The web file $210_3$ is then served to the browser 216 (step 4).

The process described thus far is the same process that may be used to retrieve a web file that includes only static data. A web file having only static data may be rendered by the browser 216 after being received by the browser. In contrast, in accordance with one aspect of the present invention, when a web file having dynamic content therein is received by the browser 216, the browser scans the web file and finds the script 222, which is executed by the client machine 202. When the script 222 is executed, it first creates in the browser 216 a frameset 300 (step 5). A frameset allows a single browser window to be divided into one or more sections, each with an independent web page loaded inside it.

In accordance with one aspect of the present invention, the frameset 300 is preferably a single frame frameset that takes up the entire browser window. As is known, when a contemporary browser is commanded to construct a frameset, the browser will ignore the remaining text in the file (e.g., static data and/or a reference to dynamic data), so the frame is created, but typically nothing else is rendered in the browser.

In accordance with another aspect of the present invention, the script 222 also provides a reference (e.g., a URL) to the DLL 220 and the address for the same requested web file (e.g., the URL for web file $210_3$). The references to the DLL and the web file are forwarded to the web server machine 204 (step 6), and the DLL 220 is executed at the web server machine 204. Upon execution, the DLL 220 retrieves and opens the web file (steps 7 and 8), and scans through the document for an indication that database information should be inserted. For example, dynamic content may be retrieved from the database 214 for the web file $210_3$ in accordance with instructions in the XML tag 228. If the DLL 220 finds an indication of dynamic information, it retrieves dynamic content for the web file from the database 214 (step 9). The dynamic content is loaded into the web file $210_3$, and the web file $210_3$ with the dynamic content loaded therein is forwarded to the browser 216 (step 11). The DLL 220 removes or otherwise alters the instructions to write the frameset along with the reference to the DLL in the web file, so that the dynamically combined document does not recursively try to create another frameset and/or request the DLL. Alternatively, the script may check to make sure that the URL of the page on which it's executing does not contain a reference to the DLL which does the dynamic processing, so it will not execute recursively. The combined web file $210_3$ and the document become the content for the newly created frameset 300, and are rendered as a viewable document.

Another code package may be substituted for this DLL 220 to provide similar functions. For example, an ASP page or an executable may be utilized, or any mechanism that executes code on a server when a user tries to retrieve it's address.

The following is an example of a script file that may be inserted in a web page having dynamic content in accordance with one aspect of the present invention:

```
//========================= owsredir.js
=========================
function WriteFrames (strFrameUrl)
{
    document.write ("<meta name=\"OSEPageType\"
content=\"OSEFrameset\">");
    document.write ("<frameset ROWS=\"100%, 0\"
FRAMEBORDER=\"NO\">");
    document.write ("<frame Name=\"redir\" src=\" " +
strFrameUrl + "\">");
    document.write ("</frameset>");
}
function WriteError (strError)
{
    var L__ScriptError_Text ="There was an error in the
script";
    document.write ("<H4>");
    document.write (L__ScriptError_Text);
    document.write ("<br>" + strError);
    document.write ("</H4>");
    document.write ("<p>");
}
function RedirectToFrame (strSvcRelDocUrl, strSrvRelSvcUrl)
{
    var strDocPath =
document.location.pathname.toLowerCase ( );
    var strProtocol =
document.location.protocol.toLowerCase ( );
    var L__NotOnHttpError_Text = "This file only works on
HTTP servers.";
    if (strProtocol.indexOf ("http") == −1)
    {
        if
(document.location.pathname.indexOf ("FrontPageTempDir") == −1)
            WriteError (L__NotOnHttpError_Text);
    }
    else if (strDocPath.indexOf ("owssvr.dll") == −1)
    {
        var strHost = document.location.host;
        var strQuery = " ";
        //var idxSvcRelDocUrl =
strDocPath.lastIndexOf (strSvcRelDocUrl.toLowerCase ( ) );
        /*
        if (idxSvcRelDocUrl == −1)
        {
            WriteError ("Could not find \" "+
strSvcRelDocUrl + "\" in \" " + strDocUrl + "\".");
        }
        else
        */
        {
            var strDocUrl = document.location.href;
```

-continued

```
            var idxQuery = strDocUrl.indexOf ("?");
            if (idxQuery != −1)
                strQuery = "&" +
strDocUrl.substring (idxQuery+1);
                // var strSvcUrl = strProtocol + "//" +
strHost + strDocPath.slice (0, idxSvcRelDocUrl);
                // var strFrameUrl = strSvcUrl +
"_vti_bin/owssvr.dll?Using=" + strSvcRelDocUrl + strQuery;
                // var strFrameUrl = strFullSvcUrl +
"/_vti_bin/owsssvr.dil?Using=" + strSvcRelDocUrl +
strQuery;
            // Fix 010__141598
                var strSrvUrl = strProtocol + "//" + strHost;
            if (strSrvRelSvcUrl.length > 1 &&
strSrvRelSvcUrl.lastIndexOf ("/") == 0)
                strSrvRelSvcUrl += "/";
                var strFrameUrl = strSrvUrl + strSrvRelSvcUrl
+ "_vti_bin/owssvr.dll?Using=" + strSvcRelDocUrl +
strQuery;
                WriteFrames (strFrameUrl);
            }
        }
        else
            document.write ("<meta name=\"OSEPageType\"
content=\"OSEContentPage\">");
}
function HelpWindow (strSrvRelSvcUrl)
{
    var strProtocol =
document.location.protocol.toLowerCase ( );
        var strHost = document.location.host;
        var strSrvUrl = strProtocol + "//" + strHost;
        if (strSrvRelSvcUrl.length > 1 &&
strSrvRelSvcUrl.lastIndexOf ("/") == 0)
                strSrvRelSvcUrl += "/";
        var strHelpUrl = strSrvUrl + strSrvRelSvcUrl +
"_vti_bin/help/wshome.htm";
        var wndHelp = window.open (strHelpUrl, "MSOWSHELP");
        wndHelp.focus ( );
        return false;
}
        //======================= owsredir.js ===========
```

In the above example, at the first part of the script, the frameset 300 is written. The frameset 300 takes up, in this example, one hundred percent of the browser window, and does not have a border. It can be understood that the script may define that the frameset may take up any part of the browser window, with or without a border. However, by taking up one hundred percent of the browser window and not having a border, the process of the present invention of providing a frameset is essentially not noticed by the user. That is, the dynamically rendered web file is retrieved by the server and becomes the content for the entire browser window.

The content of the frameset is defined as the output of the command "redir", which, as is described further below, is the dynamically rendered web file returned from the output of the DLL 220. If there is an error in reading the script, then the script handles appropriately, i.e., sends an error message (e.g., "There was an error in the script").

The function redir includes a determination of the path to the document and the protocol of the server. The script may define a particular protocol in which the function redir will work. For example, if the protocol is not HTTP or some other acceptable protocol, then the script may send an appropriate error message to the client machine (e.g., "This file only works on HTTP servers"). Likewise, if the path to the document is not found or cannot be found, then a message maybe sent to the user.

The script then determines whether there are any queries attached to the URL that was originally sent to the server to request the web file. Parameters that were sent with the original URL request are passed to DLL by appending the string for the parameters to the URL for the DLL. In this manner, the parameters are acted on by the DLL, and become a part of the dynamically rendered web page. For example, parameters to sort the dynamically loaded content according to particular criteria are added to a DLL, and the sort parameters are applied to the dynamic content upon loading. This feature permits a user to click on a link to sort the content, which affects the URL in the address bar, not just the URL to the DLL inside of the frame. Thus, for example, when the user emails a hyperlink to the sorted content, or saves that page in favorites in a browser, the URL contains all of the necessary information to retrieve that same sorted state.

The DLL is then sent instructions to retrieve the dynamic document, and the dynamic document is returned as the content for the frameset 300.

Figure 4:
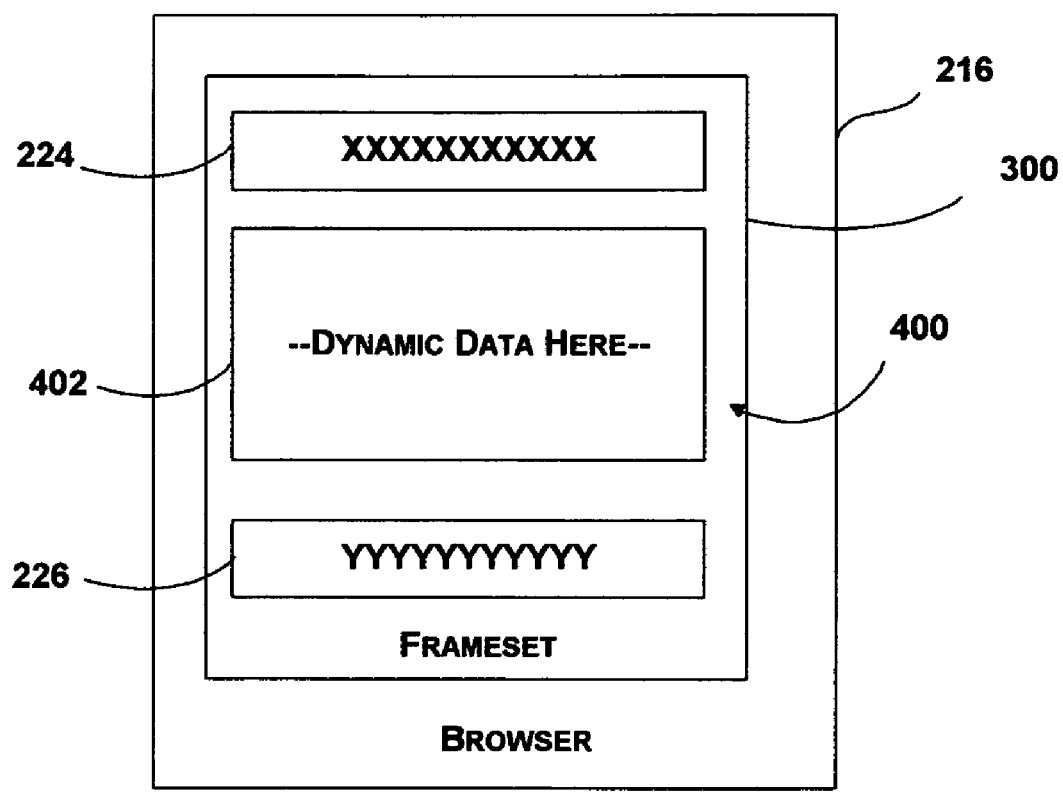
FIG. 4 is a representation of a dynamically rendered web page created from the steps shown in FIG. 3.

FIG. 4 is a representation of a dynamically rendered web page 400 created from the steps shown in FIG. 3. As stated above, the dynamically rendered web page 400 is formed from the web file 210₃ and the dynamic data from the database 214. When rendered, the text and/or graphics 224, 226 (i.e., the static data) from the web file 210₃ are viewable in the frameset 300, as well as dynamic data 402 added during the DLL processing of the document. The script 222 is preferably not viewable in the dynamically rendered web page 400. Likewise, the script 222 is preferably not viewable when the web file 210₃ is accessed by the web authoring tool 208 for editing. A web authoring tool (e.g., the web authoring tool 208) instead ignores the script and permits direct editing of the web file.

In an alternative embodiment, a frameset is not used, and a link is provided in the web file to the DLL. In this embodiment, the static data in web file is rendered upon the first request for the document, and the DLL returns the dynamically combined document, which replaces the view within the browser. Thus, the user is flashed two different pages, albeit generally close to one another, depending primarily upon connection speeds between the client machine 202 and the web server machine 204. Providing the frameset in the embodiment described with respect to FIGS. 2 and 3 renders only one view in the browser, and may provide a better experience for the user. Moreover, in the alternate embodiment, the URL shown in the address bar ultimately ends up being the URL to the DLL. In the embodiment described with respect to FIGS. 2 and 3, the frameset 300 includes a URL to the original web file 210₃, so the address bar for the browser indicates the URL to the actual web file. This feature is important because some browsers (e.g. MSFT Internet Explorer browsers earlier than version 4.0) provide an "Edit" button that launches an editing application for the document currently being viewed. The edit function does not work correctly if the address is to a DLL, because the web file cannot be edited and then saved to the DLL's address, because doing so may destroy the server DLL code.

In another alternative embodiment, I-frames may be utilized for the dynamic data, and the static data may be displayed upon the first request for the web file. As is known, I-frames permit a frame to be entered between text and graphics on a web page, and the content of the I-frame may be filled by other content, for example, dynamic content accessed via a URL. The dynamic data is retrieved by the DLL, and is sent by the web server machine 202 to the browser as the content of the I-frames.

Within the frame, the reference to the dynamically rendered web page becomes a URL to the DLL instead of a URL to the actual file for the dynamically rendered web page. A base tag is created that represents a dynamically-set URL to the actual file for the dynamically rendered web page. As is known by a person of skill in the art, a base tag essentially instructs the browser to pretend that the current page is located at some URL other than where the browser found it. The base tag typically is written into the head section for an HTML page. To dynamically set the base tag to the dynamically rendered web page, the DLL sets the base tag to "parent", which indicates to the browser that the URL to the dynamically rendered web file is the URL for the document within the frame. The base tag may be used in relative hyperlinks (links to pages or other content that is related to the dynamically rendered web page), so that the hyperlinks are not broken. In addition, by setting the target for the base tag to "parent", navigation from within the frame navigates a user to outside the frame, instead of maintaining the user within the frame.

Figure 5:
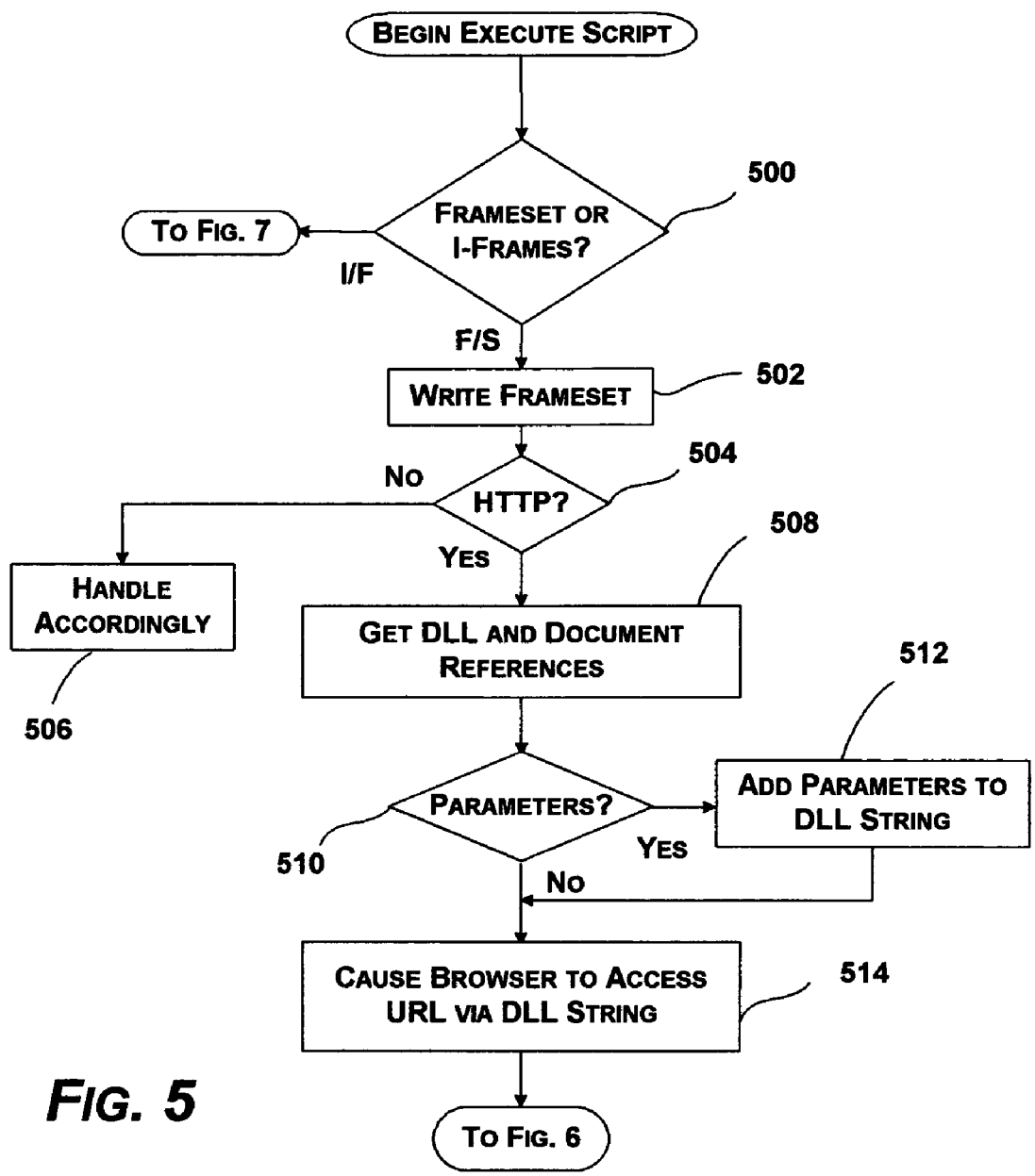
FIGS. 5 to 7 comprise a flow diagram generally representing steps for rendering a web file having dynamic content in accordance with one aspect of the present invention.

Turning now to an explanation of the operation of the present invention, FIG. 5 shows a general overview of a process for rendering a web file having dynamic content in accordance with one aspect of the present invention. It is assumed that the web file includes references to dynamic content and the special script 222 described above. To begin the process, a user requests, e.g., via the client machine 202, the web file having dynamic content. The web server software 218 receives the request and retrieves the web file and the web file is served to the browser 216. At this point, the client machine 202 and the server machine 204 are unaware of whether the web file includes references to dynamic content. As stated above, at this time, if dynamic content were not present, the web file is handled like an ordinary web file, i.e., is rendered. However, in this example, the requested web file includes dynamic content and the script 222. Upon receiving the web file, the browser 216 scans the web file and finds the script (e.g., the script 222), which is executed by the client machine 202. The process of FIG. 5 begins at execution of the script.

At step 500, the browser behaves differently depending upon whether the web file includes instructions to write a frameset or instructions to write I-frames. If the script includes instructions to write I-frames, then step 500 branches to step 700 of FIG. 7 as is described below. If, however, the script includes instructions to write a frameset, step 500 branches to step 502, where the script creates in the browser 216 a frameset.

Step 504 tests whether the server handles the proper protocol, e.g., HTTP. If not, step 504 branches to step 506, where the script handles accordingly, e.g., provides an error message. If the server does handle the proper protocol, step 504 branches to step 508, where the script provides a reference (e.g., a URL) to the DLL 220 and the address for the earlier requested web file. The reference to the web file is added to the DLL string.

If there were parameters attached to the original request for the web file, then step 510 branches to step 512, where the parameters are appended to the URL string that identifies the DLL. The DLL string (with parameters) is then forwarded to the server (step 514). If there were not parameters attached to the original request for the web file, then step 510 branches to step 514 where the DLL string is forwarded to the server.

Figure 6:
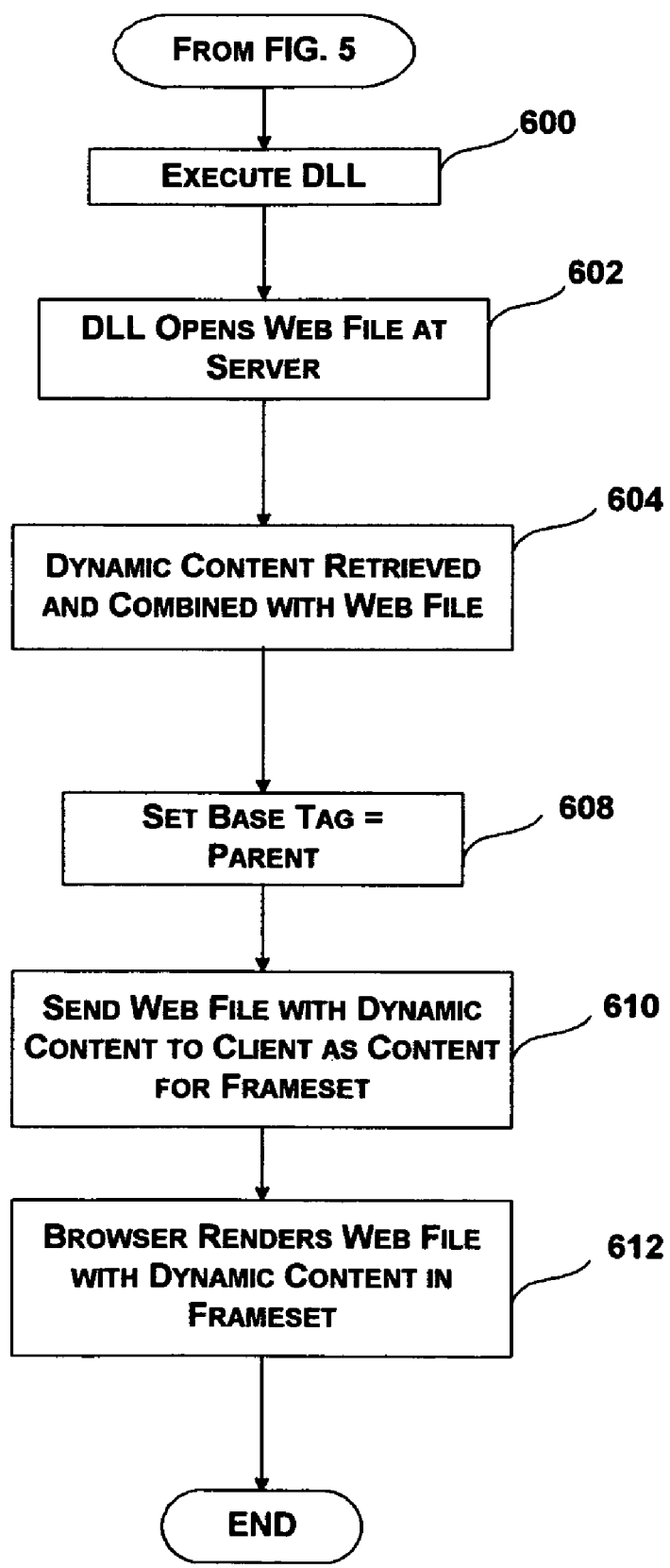

From step 514, the process proceeds to FIG. 6, where at step 600, the DLL is executed at the web server machine 204. Upon execution, the DLL retrieves and opens the original web file (step 602), and scans through the document for an indication that dynamic information should be inserted. If the DLL finds an indication of dynamic information, at step 604 it retrieves dynamic content for the web file from the database 214 and loads the dynamic content into the now-modified web file.

At step 606, a base tag is defined and set to parent for the combined web file and content. As described above, setting the base tag to parent indicates to the browser that the URL to the content inside the frame is the URL to the actual web file, and not the DLL. At step 608, the web file with the dynamic content loaded therein is forwarded to the browser 216 as content for the frameset. The combined web file and the dynamic content become the content for the newly created frameset, and are rendered by the browser as a viewable document (step 610).

Figure 7:
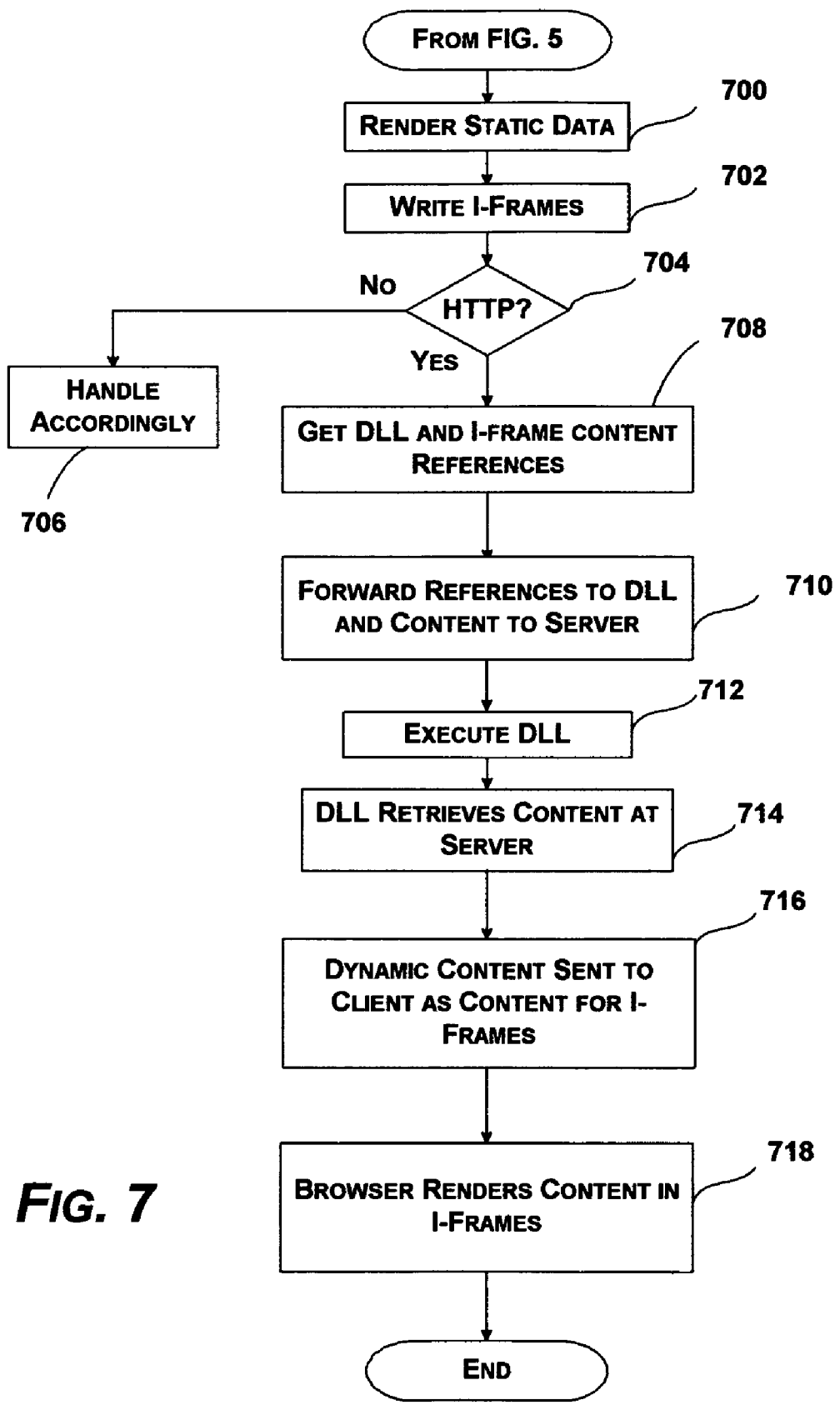

Turning now to FIG. 7, as stated earlier, if the script includes instructions to write I-frames, then step 512 (FIG. 5 branches to step 700, where the static data in the web file is rendered in the browser. At step 702, the I-frames are written into the browser. These two steps may be combined in one step by the browser. For example, all content may be rendered by the browser, including the tags that represent the I-frames, and the blank rectangles of the appropriate size to hold the I-frame content.

Steps 704 to 706 are logically similar to steps 514-516, and thus for simplicity the description of these steps is not repeated here. The script for each I-frame is executed as it is reached during the course of page rendering. When an I-frame tag is rendered, and the source URL for the dynamic content for the I-frame is determined by the script (step 708), the script is executed and a request is sent to the server to retrieve the I-frame dynamic content (step 710).

At step 712, the DLL is executed at the server. The DLL retrieves the dynamic content (step 714), and sends the dynamic content to the client machine 202 as the content of the I-frame (step 716). The browser renders the dynamic content in the I-frame at step 718. As the I-frame contents are returned, the I-frames may be re-rendered. In a long page, this may happen before all of the static content is rendered.

As can be seen, the present method is advantageous in that it provides a method for downloading an editable web page having corresponding dynamic content without requiring filtering of addresses returned by the server. Moreover, by providing a frameset, the present invention provides the dynamically rendered web page in what appears to a user to be a single downloading process.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method of rendering a web page including dynamic content, comprising:
   requesting, at a client, a web file, the web file to be displayed by a web browser at the client;
   receiving, at the client, the web file including an executable script and at least one portion that is filled by dynamic content from a web server, the executable script to be executed by the client;
   the browser at the client scanning the web file and finding the executable script;
   without user intervention, executing the script at the client;
   upon the client executing the script creating a frameset within the web browser and providing the web server with a URL to a dynamic link library (DLL) that is located in the web server along with the URL address of the originally requested web file;

determining if there is an error in reading the script, and determining that the web server handles the proper protocol;

after having executed the executable script by the client, the client forwarding to the web server the URL address of the originally requested web file and the URL to the DLL;

receiving, at the client, from the web server, the web page with the dynamic content loaded therein, the web page with the dynamic content having been produced by the server executing the DLL, opening the web file by the web server, scanning the web file for an indication that the dynamic content should be inserted, retrieving the dynamic content from a database, and loading the dynamic content into the web file;

rendering, at the client within the created frameset, a viewable document comprising the web file including the dynamic content;

wherein receiving the dynamic content comprises receiving the web file with information corresponding to the dynamic content incorporated therein;

wherein the web file including the dynamic content information comprises an altered version of the script; and wherein the web file with the dynamic content information comprises information used to prevent the client from requesting the web server to execute the DLL upon the web file including the dynamic content information being received.

2. The method of claim 1, wherein the script is included from another source.

3. The method of claim 1, further comprising writing a frameset in network access software in response to executing the script.

4. The method of claim 1, wherein requesting the web file comprises providing parameters.

5. The method of claim 4, wherein requesting the web server to execute the DLL includes sending the parameters with the request.

6. The method of claim 5, wherein receiving the dynamic content further comprises receiving the dynamic content with the parameters applied thereto.

7. A computer-readable storage medium having stored thereon computer-executable instructions for performing the method of claim 1.

8. In a computer system, a method of providing dynamic content for a web file, comprising:

receiving, at a web server, a request from a client for the web file;

sending the requested web file, including an executable script, the script to be executed by the client, and at least one portion that is to be filled by dynamic content, to the client;

receiving, at the web server, a URL address of the web file and a URL to a dynamic link library (DLL) at the web server, from the client having executed the script without user intervention, and which execution caused the client to create a frameset within a web browser;

executing the DLL at the web server;

opening the web file;

scanning the web file for an indication that the dynamic content is to be inserted therein;

retrieving the dynamic content from a database;

loading the dynamic content into the web file; and returning to the client the web file with the loaded dynamic content for rendering at the client within the created frameset a viewable document comprising the web file including the dynamic content;

wherein the web file with the loaded dynamic content comprises an altered version of the executable script, and wherein the web file with the loaded dynamic content comprises information used to prevent the client from requesting the web server to execute the DLL upon the client receiving the web file with the loaded dynamic content.

9. The method of claim 8, wherein the script is included from another source.

10. The method of claim 8, wherein the request for the web file comprises parameters included therewith.

11. The method of claim 10, wherein the request to execute the DLL includes parameters with the request.

12. The method of claim 11, further comprising applying the parameters to the dynamic content.

13. A computer-readable storage medium having computer-executable instructions stored thereon for performing the method of claim 8.

* * * * *